US 6,554,372 B1

(12) United States Patent
Mackiewicz et al.

(10) Patent No.: US 6,554,372 B1
(45) Date of Patent: Apr. 29, 2003

(54) HYDRAULIC BRAKE SYSTEM

(75) Inventors: John E. Mackiewicz, Niles, MI (US); Timothy Jay Albert, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/028,846

(22) Filed: Dec. 20, 2001

(51) Int. Cl.$^7$ ................................................ B60T 13/18
(52) U.S. Cl. ................ 303/11; 303/116.2; 303/DIG. 11
(58) Field of Search .................... 303/10, 11, DIG. 11, 303/116.1, 116.2

(56) References Cited

U.S. PATENT DOCUMENTS

| | | | |
|---|---|---|---|
| 4,627,670 A | * 12/1986 | Matsuda et al. | 303/115.4 |
| 5,547,264 A | * 8/1996 | Tozu et al. | 303/9.62 |
| 6,189,982 B1 | * 2/2001 | Harris et al. | 303/116.1 |
| 6,276,765 B1 | * 8/2001 | Towers et al. | 303/122.1 |
| 6,315,371 B1 | * 11/2001 | Wachi et al. | 303/155 |
| 6,412,882 B1 | * 7/2002 | Isono et al. | 303/114.1 |
| 6,478,385 B1 | * 11/2002 | Nishii et al. | 303/114.1 |

* cited by examiner

Primary Examiner—Jack Lavinder
Assistant Examiner—Benjamin A Pezzlo
(74) Attorney, Agent, or Firm—Leo H. McCormick, Jr.; Warren Comstock

(57) ABSTRACT

A brake system (10) having a brake booster (12) that is responsive to an operator brake input for providing a first input force to a master cylinder (13) to develop a first brake application and is responsive to a hydraulic input for providing a second input force to a master cylinder (13) to develop a second brake application. An electronic control unit (ECU) (40) receives first input signals from sensors (19) indicative of a speed for each wheel (14,14',18,18') in a brake system of the vehicle. The ECU (40) supplies a pump (42) with an operational input signal when a sensed wheel speed indicates a wheel lock may occur between a wheel and a surface during a brake application and simultaneous activates a decay valve (17) to release pressurized fluid from actuation of the wheel brake associated with the wheel. When the sensed condition is obviated, the ECU (40) supplies a signal to close the decay valve (17) and open a build valve (15) to provide secondary pressurized fluid from a pump (42) to the wheel brake to resume and complete the first brake application. The ECU (40) also receives an input from a pressure sensor (52) associated to with an accumulator (22) and when the fluid pressure in the accumulator (22) is below a preset pressure, the ECU (40) supplies the pump (42) with an actuation signal through which pressurized fluid is developed and communicated to maintain the fluid pressure in the accumulator (22) above the preset pressure. The ECU (40) supplies valves (56,58,34) associated with the accumulator (22) with an input signal to deliver pressurized fluid from the accumulator (22) as the hydraulic input to effect the second brake application.

8 Claims, 1 Drawing Sheet

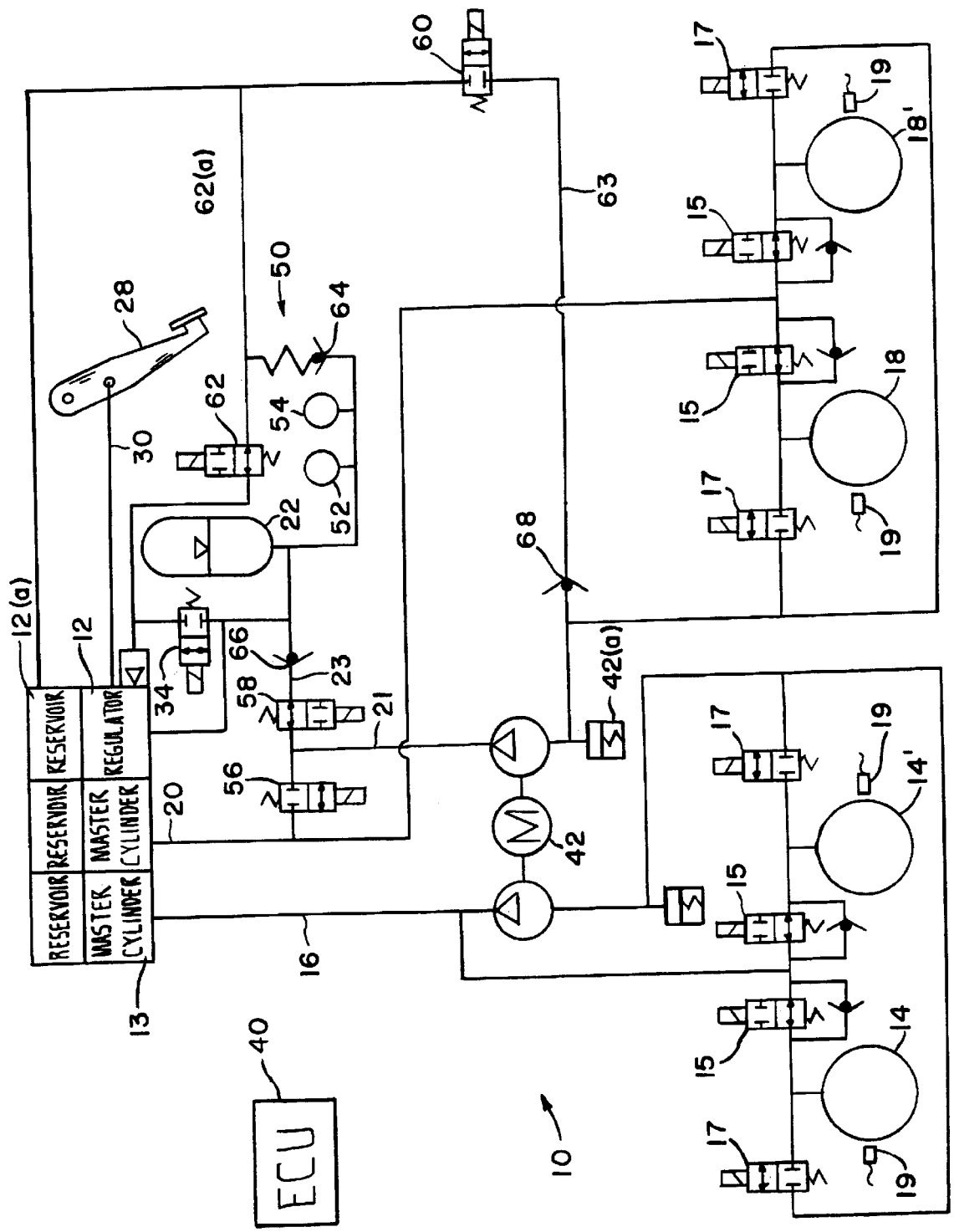

HYDRAULIC BRAKE SYSTEM

This invention relates to a hydraulic brake system wherein a pump is activated to make available secondary pressurized fluid to a wheel brake in response to an input signal from an electronic control unit (ECU) to effect a decay-built sequence of fluid pressure supplied to a wheel brake and thereby prevent a potential wheel-lock situation during a first brake application and is subsequently activated to provide pressurized fluid to an accumulator that provides a brake booster with a hydraulic input to develop a force that acts on a master cylinder piston to effect a second brake application in responsive to an input from the ECU that indicates conditions under which the vehicle is operating may impair a safe operation.

BACKGROUND OF THE INVENTION

In hydraulic brake systems for vehicles, it is common to use hydraulic fluid generated by a pump as a source of power to effect a brake application such as disclosed in U.S. Pat. No. 5,120,115. When a traction control function is added to this type hydraulic booster in a manner as disclosed in U.S. Pat. No. 4,815,793, the total length of the regulator and master cylinder may become an issue in a vehicle where under the hood space is limited. In order to reduce the overall length of this type hydraulic brake booster, it has been disclosed in U.S. Pat. Nos. 4,843,819 and 6,203,119 to use parallel boost pistons, which are connected to a master cylinder. However, when under the hood space is critical, a brake booster of the type disclosed in U.S. Pat. Nos. 4,514,981 and 6,142,584 have been used to control the supply of pressurized fluid to effect a brake application. These hydraulic brake boosters have satisfied many of the operational requirements of vehicle braking systems but space requirements and added cost associated with additional components limit acceptability by many customers.

The hydraulic brake booster may also be of a type as disclosed in U.S. Pat. Nos. 4,281,585; 4,539,892; 4,625,515 and 5,960,629 wherein an operational force for activating a master cylinder is derived by regulated pressurized hydraulic that acts on a piston to produce a force that correspondingly acts on a piston in a master cylinder to pressurized fluid used to effect a brake application.

It has been suggested that additional features, such as traction control and dynamic operational control can be implemented into a brake system through a modification of the inputs to an Electronic Control Unit (ECU) for a wheel lock control as some of the structural components, i.e. wheel speed sensors, build and decay valves and motor pump, necessary to provide such features are already available in a brake system.

SUMMARY OF THE INVENTION

A primary object of the present invention is to provide a brake system wherein a pump associated with a wheel lock system is utilized to supply an accumulator with pressurized fluid that is thereafter communicated as a hydraulic input force in response to an operator input applied to a brake pedal or under the control of a ECU to activate a brake booster for the development of a brake application to alleviate a sensed condition determined by the ECU that may impair safe operation of a vehicle.

According to this invention, the ECU receives inputs from various sensors associated with the operation of the vehicle and controls the operation of a pump for the wheel lock system to implement braking of the vehicle to attenuate the sensed condition. In this brake system, a brake booster is responsive to an operator brake input for providing a first input force to a master cylinder for pressurizing fluid therein. This pressurized fluid is thereafter supplied to wheel brakes in the brake system of a vehicle to effect a first brake application. The ECU receives among others signals, first input signals from sensors that indicate a speed of each wheel in the brake system of the vehicle. When a sensed speed indicates a condition where an imminent wheel lock may occur between the wheel and a surface the ECU supplies a decay valve associated with each wheel brake with a second input signal to open communication to a low pressure sump and allow pressurized fluid to be released from a wheel brake. When the condition is overcome, the ECU terminates the second input signal and the decay valve closes and supplies a third input signal to open a build valve associated with each wheel brake and allow secondary pressurized fluid from a pump to be supplied to the wheel brake for a continuance of said first brake application. When the ECU supplies the second input signal to the decay valve, the ECU simultaneously supplies a fourth input signal to the pump to begin the development of the secondary pressurized fluid and assure that the first brake application is completed in a manner desired by the operator as derived from the first input force. The ECU is also connected to a hydraulic input arrangement to control the timing and initiation of the communication of a hydraulic input force that is provided to the brake booster to effect a second brake application and alleviate a condition that may impair safe operation of a vehicle. The hydraulic input arrangement is characterized by an accumulator that is connected to receive and retain secondary pressurized fluid from the pump associated with the wheel lock feature in the brake system. The secondary pressurized fluid retained in the accumulator is selectively supplied to the brake booster as an actuation input to hydraulically activate the brake booster to effect the second brake application. A first sensor associated with the accumulator provides the ECU with an indication of the fluid pressure of the secondary pressurized fluid in the accumulator. When the fluid in the accumulator is below a predetermined value, the ECU directs a sixth input signal to activate the pump and supply the secondary pressurized fluid to the accumulator. In order to direct the secondary pressurized fluid to the accumulator, the ECU supplies a plurality of valves in the brakes system with input signals to either open or close communication to the pump. The plurality of valves includes: a first valve that is closed for preventing communication of pressurized fluid from the master cylinder to the pump means during that portion of the first brake application when pressurized fluid is supplied by the master cylinder to the wheel brakes and opened for allowing communication of secondary pressurized fluid from the pump to the wheel brakes when the fourth input signal is supplied to activate the pump; a second valve that is opened for allowing communication of the secondary pressurized fluid to the accumulator from the pump in response to the sixth input signal from the ECU and closed for preventing the communication of the secondary pressurized fluid from the pump to the accumulator during the communication of the fourth input signal to the pump when the pressurized secondary fluid is supplied to the build valve to the wheel brake; and a third valve responsive to the fourth input signal for preventing fluid from a source associated with the brake booster being communicated to the pump during communication of secondary pressurized fluid to the wheel brakes to assure that sufficient fluid is present in the brake booster system.

An advantage of this invention resides in a brake system wherein a pump is selectively controlled by an ECU to primarily function to supply secondary pressurized fluid to wheel brakes through a build valve and sustain a desired brake application and to function as a source for secondary pressurized fluid retained in an accumulator to provide the force to activate a actuator in response to the ECU.

A further advantage of this invention resides in a plurality of valves that are selectively activated by an ECU to provide an accumulator with secondary pressurized fluid that is utilized as a power source to activate a brake booster to effect a secondary brake application to attenuate conditions sensed by an ECU that may impair safe operation of a vehicle.

BRIEF DESCRIPTION OF THE DRAWINGS

The drawing is a schematic illustration of a brake system made according to the principals of the present invention.

DETAILED DESCRIPTION

The brake system 10 as shown in FIG. 1 includes a hydraulic brake booster or regulator 12 for supplying a master cylinder 13 with an operational force to pressurized fluid that is supplied to a first set of wheel brakes 14,14' by a first conduit 16 and to a second set of wheel brakes 18,18' by a second conduit 20 to effect a brake application. The hydraulic brake booster 12, which is commonly referred to as a closed center regulator of a type disclosed in U.S. Pat. No. 6,203,119 that is selectively activated by either a manual force applied through a brake pedal 28 to input rod assembly 30 that is connected a control valve to develop an operational force for effecting a first brake application or by a hydraulic force developed as a function of a signal received from an electronic control member (ECU) 40 that activates a solenoid valve 34 in the hydraulic actuation arrangement 50 to allow pressurized hydraulic fluid to flow from an accumulator 22 to hydraulically act on a piston in the brake booster 12 to independently effect a second brake application.

The brake system 10 also includes a wheel lock assembly that attenuates rotation of a wheel when rolling on a surface and decelerating from a first speed to a second speed when locking may occur during a brake application. The wheel lock assembly as illustrated includes an electric motor pump 42; and a build solenoid valve 15, a decay solenoid valve 17 and a wheel speed sensor 19 for each wheel in the first set of wheel brakes 14,14'and in the second set of wheel brakes 18,18'to provide the electronic control unit (ECU) 40 with an input signals to provide information or data relating to a current functional operational of the vehicle. In addition to these input signals, the ECU 40 also receives and evaluates other inputs and data relating to the vehicle including but not limited to: the operation of the motor pump 42; the pressure of the pressurized supply fluid; dynamic forces experienced by the vehicle; accumulator fluid supply pressure, the level of fluid in a reservoir and etc., all inputs which relate to the operation of the vehicle and may effect a brake application.

The hydraulic actuation arrangement 50 includes the accumulator 22 that is connected to conduit 21 coming from electric motor pump 42, a first pressure sensor 52 that provides the ECU 40 with a reading to indicate the fluid pressure in the accumulator 22, a second pressure sensor 54 the provided the ECU with a signal through which an operator is alerted that the fluid pressure in the accumulator is below a preset value and further operation of the hydraulic actuation arrangement may be not occur unless the fluid pressure in the accumulator 22 is replenished; and a plurality of valves that control the communication of secondary pressurized fluid from the pump 42 to the accumulator 22.

In more particular detail, the plurality of valves includes: a first valve 56 for selectively controlling communication of pressurized fluid from the pump 42 to the supply conduit 20 from the master cylinder 13 or to delivery conduit 23 to the accumulator 22; a second valve 58 for selectively communicating of pressurized fluid from pump 42 to the accumulator 22 by way of conduit 23 and for preventing communication of pressurized fluid from the accumulator 22 through conduit 23 to conduit 20 when valve 56 is opened to allow communication of secondary pressurized fluid from pump 42 to conduit 20; a third valve 60 for selectively controlling communication of fluid from reservoir 12a to pump 42 through conduit 63; a fourth valve 34 through which the accumulator 22 is connected to the regulator valve in brake booster 12; and a fifth valve 62 through which reservoir 12a in the brake booster 12 is connected to conduit 63 to allow secondary pressurized fluid to be released from brake booster 12 on termination of a hydraulic brake actuation signal from the ECU 40.

The hydraulic actuation arrangement 50 further includes a relief valve 64 to limit the pressurized fluid supplied to the accumulator 22 from pump 42 and pressure caused by thermal expansion in the brake system 10 and a first check valve 66 located in conduit 23 to prevent pressurized fluid from accumulator 22 from being communicated and acting on valve 58 when valve 58 is closed and a second check valve 68 that prevents fluid available in sump 42a from being communicated into conduit 62.

Functionally, the hydraulic brake booster 12 responds to an operator input force applied to brake pedal 28 by an operator to develop an operational force that moves pistons in master cylinder 13 to develop and supply primary pressurize fluid to operate wheel brakes 14,14' and wheel brakes 18,18' and effect a first brake application. During the operation of a vehicle, the ECU 40 continually receives inputs from various sensors that report on the operation of the vehicle including the wheel speed sensors 19 associated with each wheel in the brake system. During a brake application when the vehicle is operating in accordance with pre-set conditions stored in the ECU 40, the wheel lock arrangement is not activated and on termination of the operator input force to brake pedal 28, the operation of the brake booster 12 is returned to a rest state.

During a brake application as illustrated above should inputs relating to the operational braking conditions currently experienced by the vehicle and evaluated by the ECU 40 indicate a less than optimum operation situation is occurring or forthcoming i.e. wheel lock, the ECU 40 is programmed to transmit an operating signal that activates the wheel lock arrangement. In this situation, the ECU 40 receives a first input signal from a wheel speed sensor 19 that indicates of the speed of a wheel in the brake system of the vehicle is such that a wheel lock will likely occur between the wheel and a surface. The ECU 40 thereafter transmits a second input signal to open the normally closed the decay valve 17 of the wheel brake where wheel is evaluated to most likely to occur and allows pressurized fluid to be released from the wheel brake. This released pressurized is communicated to low pressure sump 42a of motor pump 42. When the ECU 40 supplies the second input signal to a decay valve 17, it simultaneously transmits a third input signal to close the normally opened build valve 15 and a fourth input signal to start motor pump 42 and initiate pressurization of fluid drawn from sump or reservoir 42a.

The fourth signal also activates and opens the normally closed valve 56 to allow communication of secondary pressurized fluid to conduit 20, closes normally opened valve 58 to prevent communication of pressurized fluid stored in 22 from being communicated through conduit 23 and closes normally opened valve 60 to prevent the drawing of fluid from reservoir 12a into pump 42. Signals from the ECU 40 cycles the opening and closing of the decay valve 17 and the build valve 15 to reduce the possibility of wheel lock for the particular wheel. When the condition is overcome as determined by the information supplied to the ECU 40, the input signals supplied to activate valves in the wheel lock arrangement are terminated and the valves returned to their normal state where primary pressurized fluid from the master cylinder 13 is responsive for effecting the first brake application per the input applied to brake pedal.

The brake system 10 is enhanced through the hydraulic actuation arrangement 50 per the present invention. The hydraulic actuation arrangement 50 independently activates the brake system 10 when the ECU 40 determines a situation exists that may impair safe operation of the vehicle for effecting a second brake application. In order assure that the hydraulic actuation arrangement 50 has sufficient force to activate the brake booster 12 it is necessary for accumulator 22 to store and maintain the pressurized hydraulic fluid stored therein at a predetermined pressure level. Thus, the fluid pressure in accumulator 22 is monitored by pressure sensor 52 and should the fluid pressure therein be below a predetermined value, a sixth input signal is transmitted to ECU 40. At this time should the other sensors that supply information to the ECU 40 indicate a situation occurring such as a wheel lock function, the ECU 40 delays the communication of pressurized fluid to the accumulator 22 however if the sensors do not indicate a situation exist the ECU 40 provides a input signal to activate the motor pump 42 and pressurize fluid that is thereafter supplied to the accumulator 20 by flowing through opened valve 58 and check valve 66 in conduit 23. When the fluid pressure in the accumulator 22 reaches a preset valve, pressure sensor 52 transmits a pressure signal to the ECU 40 which thereafter may terminate the operation of pump 42 for this purpose. In order to protect the components in the brake system, i.e. regulator 12, accumulator 22, seals, conduit 23, from damage of high pressure should the motor pump 42 not immediately turn off or because of conditions created by high temperature expansion, relief valve 64 allows pressurized fluid to flow to reservoir 12a to assure that the fluid pressure is maintained below a maximum preset value. When the motor pump 42 is activated in this manner, fluid is drawn from reservoir 12a by way of conduit 63 as valve 60 is opened and as a result the fluid level in sump 42a is not depleted.

When the vehicle is operating under conditions as evaluated by the ECU 40 that indicate a differential wheel speed of the vehicle may be too great for safety, the ECU 40 provides the hydraulic actuation arrangement 50 with an operational signal that simultaneously closes valve 62 and opens valve 34 to allow pressurized hydraulic fluid to flow from accumulator 22 and provide a hydraulic force to operate the control valve in brake booster 12. This hydraulic force acts on a split piston in the regulator to develop an operational force that moves pistons in the master cylinder 13 to effect a secondary brake application that slows the vehicle to overcome or attenuated the situation. When the situation is overcome or the vehicle slows sufficiently, a signal from the ECU 40 closes valve 34 and opens valve 62 to allow pressurized actuation fluid to be released from the regulator 12 by flowing to reservoir 12a.

Should the vehicle be operating under conditions wherein the pump 42 is not operating or a signal from pressure sensor 52 indicates a low pressure present in the accumulator 22 and ECU 40 does not activate the pump 42, a low pressure monitor 54 independently provides a signal to, a monitor to inform an operator that the fluid pressure in the accumulator 22 may not be sufficient to hydraulically activate the hydraulic actuation arrangement 50.

We claim:

1. In a brake system having a brake booster responsive to an operator brake input for providing a first input force to a master cylinder for pressurizing fluid that is thereafter supplied as primary fluid pressure to wheel brakes in the brake system of a vehicle to effect a first brake application, an electronic control unit (ECU) for receiving first input signals from sensors indicative of a speed for each wheel in the brake system of the vehicle, a decay valve associated with each wheel brake that is responsive to a second input signal transmitted from said ECU for allowing pressurized fluid to be released from a wheel brake when a sensed speed indicates a condition where an imminent wheel lock may occur between the wheel and a surface, a build valve associated with each wheel brake that is responsive to a third input signal transmitted from said ECU when said condition is overcome for allowing secondary pressurized fluid to be supplied to the wheel brake from a pump for a continuance of said first brake application, said pump means being activated by a fourth input signal from said ECU when said second input signal is transmitted to activate said decay valve, hydraulic input means responsive to a fifth input signal from said ECU for providing a hydraulic actuation input to said brake booster to develop a second input force that is applied to said master cylinder for pressurizing fluid that is supplied to said wheel brakes to effect a second brake application, the hydraulic input means being characterized by an accumulator connected to receive said pressurized fluid from said pump means and for supplying said hydraulic actuation input to said brake booster to effect said second brake application, pressure sensor means for providing said ECU with an indication of the fluid pressure of the fluid in said accumulator for said ECU to initiate a sixth input signal when said fluid pressure is below a predetermined value, and valve means including a first valve for preventing communication of pressurized fluid from said pump means to said wheel brakes during that portion of said first brake application when primary pressurized fluid is supplied by said master cylinder and for allowing communication of secondary pressurized fluid from said pump means to said wheel brakes when said fourth input signal is supplied to said pump means; a second valve for allowing communication of said pressurized fluid to said accumulator from said pump means in response to said sixth input signal from said ECU and for preventing communication of said secondary pressurized fluid from said pump means to said accumulator during the communication of said fourth input signal to said pump means; and a third valve responsive to said fourth input signal for preventing fluid from a reservoir associated with said brake booster being communicated to said pump means during communication of secondary pressurized fluid to said wheel brakes.

2. The brake booster as recited in claim 1 wherein said valve means is characterized by said third valve being opened to allow fluid communication from said reservoir to pump means when pressurized fluid is communicated to said accumulator from said pump means.

3. The brake booster as recited in claim 2 wherein said valve means is characterized by a fourth valve through which said accumulator is connected to said brake booster and responsive to said fifth input signal from said ECU to allow said pressurized fluid to be communicated to said brake booster as said actuation input.

4. The brake booster as recited in claim 3 wherein said valve means is characterized by a fifth valve through which pressurized fluid is released into said reservoir in said brake booster on termination of said second brake application.

5. The brake booster as recited in claim 4 wherein said actuator further includes a relief valve to limit the pressure level of the pressurized fluid supplied to said accumulator.

6. The brake booster as recited in claim 5 wherein said pressure sensor means is characterized by a low pressure monitor to provide said ECU with a signal to indicate that said pump means is not responding to said sixth input signal and delivering pressurized fluid to said accumulator.

7. The brake booster as recited in claim 6 wherein said brake system is further characterized by a check valve that prevents said secondary pressurized fluid from being communicated to said reservoir through said third valve.

8. The brake booster as recited in claim 1 wherein said ECU is characterized by being responsive to said input signals from the sensors indicating the speed of each wheel before said sixth input signal indicating fluid pressure in said accumulator.

* * * * *